(12) United States Patent
Hayashi (10) Patent No.: US 11,260,613 B2
(45) Date of Patent: Mar. 1, 2022

(54) TIRE VULCANIZING MOLD

(71) Applicant: Sumitomo Rubber Industries, Ltd., Kobe (JP)

(72) Inventor: Nozomi Hayashi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 215 days.

(21) Appl. No.: 16/791,878

(22) Filed: Feb. 14, 2020

(65) Prior Publication Data
US 2020/0282678 A1   Sep. 10, 2020

(30) Foreign Application Priority Data
Mar. 7, 2019   (JP) .............................. JP2019-041722

(51) Int. Cl.
*B29D 30/06* (2006.01)
*B29D 30/72* (2006.01)
*B29C 33/30* (2006.01)

(52) U.S. Cl.
CPC ........ *B29D 30/0606* (2013.01); *B29C 33/306* (2013.01); *B29D 30/72* (2013.01); *B29D 2030/0612* (2013.01); *B29D 2030/0617* (2013.01)

(58) Field of Classification Search
CPC .............. B29D 30/0606; B29D 30/72; B29D 2030/0617; B29D 2030/726; B29C 33/10; B29C 33/306
See application file for complete search history.

(56) References Cited

U.S. PATENT DOCUMENTS

| 5,382,402 | A  | * | 1/1995  | Espie  | B29C 33/10 |
|---|---|---|---|---|---|
|           |    |   |         |        | 156/394.1  |
| 10,507,625 | B2 | * | 12/2019 | Ohara  | B29C 33/02 |
| 10,850,432 | B2 | * | 12/2020 | Ohara  | B29C 35/02 |
| 2007/0259063 | A1 | * | 11/2007 | Tanaka | B29D 30/72 |
|           |    |   |         |        | 425/36     |
| 2019/0184660 | A1 |   | 6/2019  | Ohara  |            |

FOREIGN PATENT DOCUMENTS

| GB | 2341339 | * | 3/2000 |
|---|---|---|---|
| JP | 63-264308 | * | 11/1988 |
| WO | WO 2009/007790 | * | 1/2009 |
| WO | WO 2018/061055 A1 | | 4/2018 |

* cited by examiner

*Primary Examiner* — James P Mackey
(74) *Attorney, Agent, or Firm* — Birch, Stewart, Kolasch & Birch, LLP

(57) ABSTRACT

A tire vulcanizing mold comprises a sidewall ring for molding a sidewall portion of a tire. The sidewall ring is composed of a main body provided with a circumferentially extending groove, and mold pieces mounted in the groove so as to be adjacent to each other in the circumferential direction. Between the mold pieces and/or between the main body and the mold pieces, there are formed micro-gaps for discharging gas existing in the tire vulcanizing mold so as to communicate with exhaust flow paths extending from the groove toward the outside of the mold.

20 Claims, 5 Drawing Sheets

TIRE VULCANIZING MOLD

TECHNICAL FIELD

The present invention relates to a tire vulcanizing mold having sidewall rings for molding sidewall portions of a tire.

BACKGROUND ART

Conventionally, various proposals have been made for tire vulcanizing molds comprising sidewall rings. For example, Patent Document 1 below discloses a tire vulcanizing mold provided with gaps for discharging air existing between a raw tire and sidewall rings.
Patent Document 1: International application publication No. WO2018/061055

SUMMARY OF THE INVENTION

Problems to be Solved by the Invention

In the sidewall ring described in Patent Document 1, however, the concave portions for mounting mold pieces are formed discontinuously, so the shape of the sidewall-ring's main body is complicated and difficult to process. This will increase the cost of the tire vulcanizing mold. In addition, stress tends to concentrate locally on the main body, which may reduce the durability of the sidewall-ring's main body.

The present invention was made in view of the above circumstances, and a main objective of the present invention is to provide a tire vulcanizing mold which is inexpensive and has higher durability.

According to the present invention, a tire vulcanizing mold comprises:
a sidewall ring for molding a sidewall portion of a tire,
the sidewall ring comprising a main body extending continuously in the circumferential direction thereof, and a plurality of mold pieces mounted on the main body,
the main body is provided with
a first molding surface for molding a part of the outer surface of the sidewall portion,
a circumferentially extending groove recessed from the first molding surface and extending in the circumferential direction, and
exhaust flow paths extending from the circumferentially extending groove to an outside of the main body,
each of the mold pieces has a second molding surface for molding a part of the outer surface of the sidewall portion,
the mold pieces are mounted in the circumferentially extending groove so as to be adjacently to each other in the circumferential direction, and
micro-gaps for discharging gas existing in the tire vulcanizing mold are formed between the mold pieces and/or between the main body and the mold pieces so as to communicate with the exhaust flow paths.

It is preferable that the micro-gaps include a first micro-gap formed between the main body and a first peripheral surface of each mold piece which surface is on the radially inside or radially outside of the above-said each mold piece.

It is preferable that the above-said first peripheral surface is provided with a first shallow groove for forming the first micro-gap to extend between the second molding surface and a bottom surface of the circumferentially extending groove.

It is preferable that the depth of the first shallow groove is 0.06% to 0.3% of the depth of the circumferentially extending groove.

It is preferable that the depth of the first shallow groove is in a range from 0.01 to 0.05 mm. Namely, the micro-gaps are in a range from 0.01 to 0.05 mm.

It is preferable that the micro-gaps include a second micro-gap formed between the main body and a second peripheral surface of the above-said each mold piece which surface is on the opposite side of the above-said first peripheral surface.

It is preferable that the above-said second peripheral surface is provided with a second shallow groove forming the second micro-gap and extending between the second molding surface and the bottom surface of the circumferentially extending groove.

It is preferable that the micro-gaps include third micro-gaps formed between circumferential end surfaces of the mold pieces which circumferential end surfaces are adjacent to each other in the circumferential direction.

It is preferable that the circumferential end surfaces are provided with third shallow grooves forming the third micro-gaps and extending between the second molding surface and the bottom surface of the circumferentially extending groove.

It is preferable that the third micro-gaps communicate with the first micro-gaps.

It is preferable that the circumferentially extending groove extends annularly and continuously in the circumferential direction of the sidewall ring.

It is preferable that the circumferentially extending groove includes a radially inner circumferentially extending groove and a radially outer circumferentially extending groove, and
the mold pieces include radially inner mold pieces mounted in the radially inner circumferentially extending groove, and radially outer mold pieces mounted in the radially outer circumferentially extending groove.

It is preferable that each of the mold pieces is fixed to the main body.

In the present invention, the main body is provide with the circumferentially extending groove recessed from the first molding surface, and the plurality of mold pieces are mounted in the circumferentially extending groove so that the micro-gaps are formed between the mold pieces and/or between the mold pieces and the main body. Therefore, air existing between the sidewall rings and a raw tire put in the tire vulcanizing mold when vulcanizing the tire can be discharged through the micro-gaps and the exhaust flow paths toward the outside of the mold. Further, since the mold pieces are mounted into the circumferentially extending groove so that each mold piece is adjacent to mold pieces on both sides thereof in the circumferential direction, the circumferentially extending groove is not interrupted in the circumferential direction, and the configuration or structure of the main body is simplified. Thus, the cost down of the tire vulcanizing mold is possible. Further, it becomes possible to easily improve the durability of the main body.

DESCRIPTION OF PREFERRED EMBODIMENT

Hereinafter, an embodiment of the present invention will be described with reference to the drawings.

Figure 1:
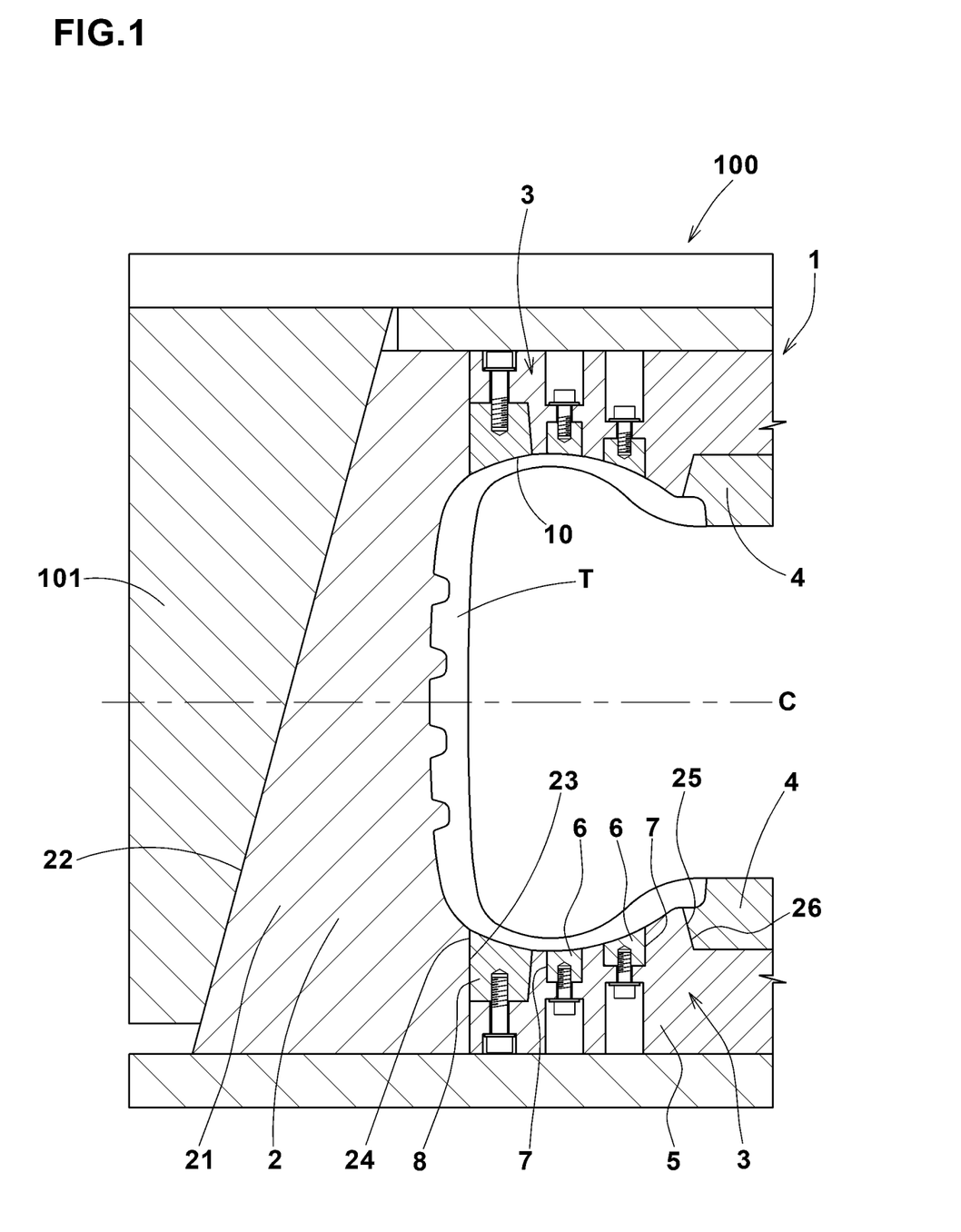
FIG. 1 is a cross-sectional partial view of a tire vulcanizing mold as an embodiment of the present invention.

FIG. 1 shows a cross section of a part of a tire vulcanizing mold 1 as an embodiment of the present invention which cross section corresponds to a meridian cross section of a tire to be vulcanization-molded including the rotational axis of the tire.

The tire vulcanizing mold 1 is attached to a tire vulcanizing apparatus 100, and is opened and closed in order to put a raw tire T in a cavity space formed inside the mold 1 and take out the vulcanization-molded tire T therefrom.

In this embodiment, the tire T to be vulcanization-molded is a pneumatic tire.

As well known in the art, a pneumatic tire comprises a tread portion, a pair of axially spaced bead portions, and a pair of sidewall portions extending between tread edges and the bead portions. Usually, a pneumatic tire is reinforced by a carcass extending between the bead portions, a tread reinforcing belt disposed radially outside the carcass in the tread portion, a bead core disposed in each bead portion and the like.

The tire vulcanizing mold 1 comprises a tread ring 2 for molding the tread portion of the tire T, a pair of sidewall rings 3 for molding the respective sidewall portions of the tire T, and a pair of bead rings 4 for molding the respective bead portions of the tire T.

The tread molding ring 2 is composed of a plurality of segments 21 divided in the tire circumferential direction. By the plurality of segments 21 arranged in the tire circumferential direction, the tread molding ring 2 which is annularly or circumferentially continuous, and extends axially from the tire equator C toward both sides thereof, is formed collectively.

Each of the segments 21 is configured to be movable in the tire radial direction. For that purpose, in this example, the radially outer surface of each of the segments 21 is provided with a sloped contact surface 22 contacting with a tapered inner peripheral surface of a container 101 of the tire vulcanizing apparatus 100. The segments 21 are moved in the tire radial direction by moving the container 101 in the tire axial direction, thereby, the mold 1 can be closed and opened.

The sidewall rings 3 are disposed radially inside the tread molding ring 2. The bead rings 4 are disposed radially inside the respective sidewall rings 3. The sidewall ring 3 and the bead ring 4 on each side of the center plane corresponding to the tire equatorial plane C are integrated and configured to be movable in the tire axial direction.

The sidewall ring 3 and the bead ring 4 are driven by the tire vulcanizing apparatus 100 to move in the tire axial direction, and thereby, the closing and opening of the sidewall rings 3 and the bead rings 4 are performed.

In order that the tire vulcanizing mold 1 is opened and closed, the segments 21, the sidewall rings 3 and the bead rings 4 are moved in synchronization.

When the tire vulcanizing mold 1 is closed, the tread molding ring 2, the sidewall rings 3 and the bead rings 4 form, by their inner surfaces, a tire molding surface 10 for shaping the outer surface of the tire T, and also a cavity space surrounded thereby, into which the tire is disposed, is formed.

The raw tire put in the cavity space is pressurized from its inner surface side by a bladder or core, and vulcanization-molded under such pressurized condition.

As shown in FIG. 1, in the closed state of the mold 1, at joints 23 between the tread molding ring 2 and the sidewall rings 3, micro-gaps 24 are formed therebetween.

Also, micro-gaps 26 are formed at joints 25 between the sidewall rings 3 and the bead rings 4.

Here, the term "micro-gap" means a very small gap which allows air to pass through but does not allow fluid rubber to pass through during the vulcanization process.

Figure 2:
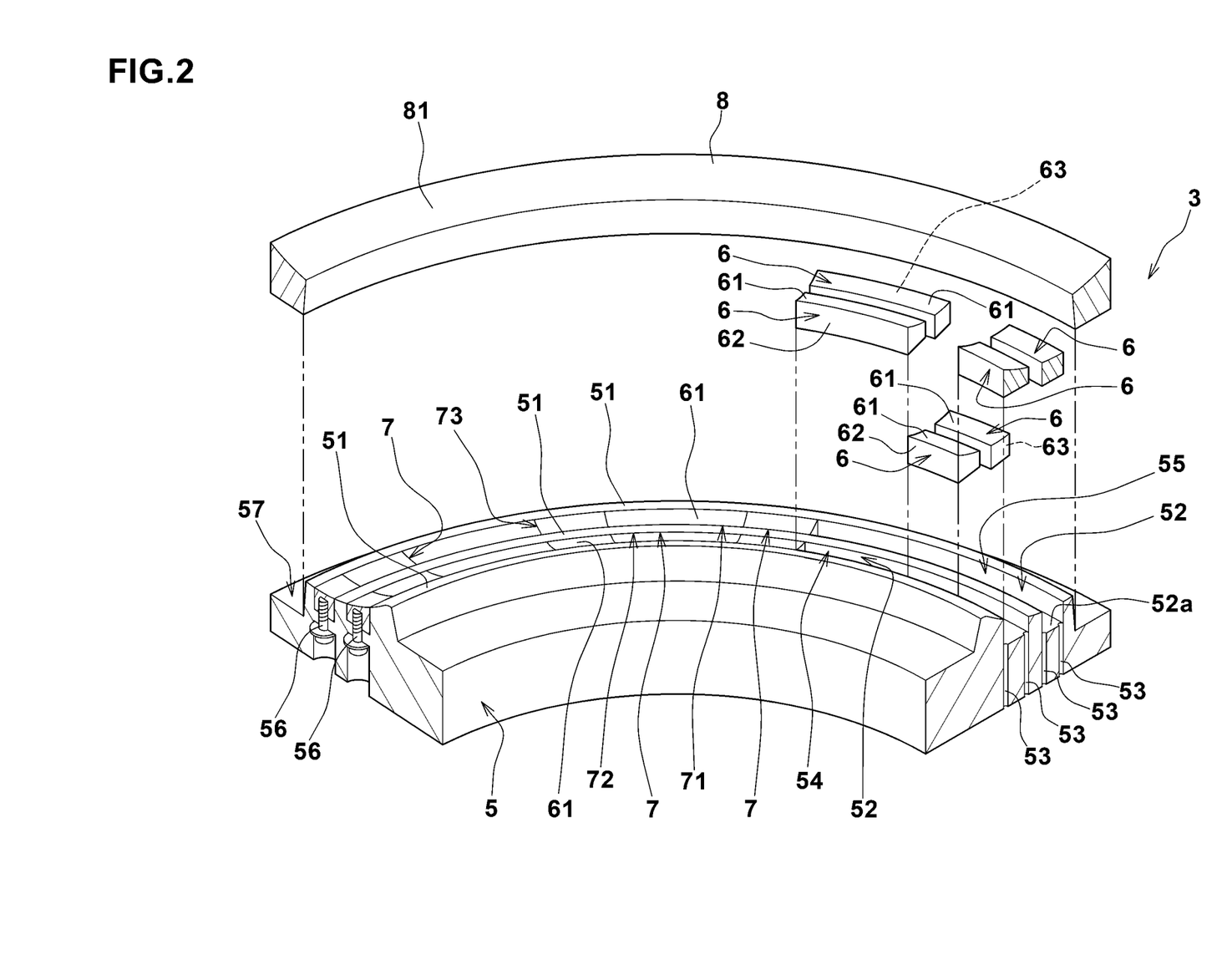
FIG. 2 is a schematic perspective partial view of a sidewall ring shown in FIG. 1.
Figure 3:
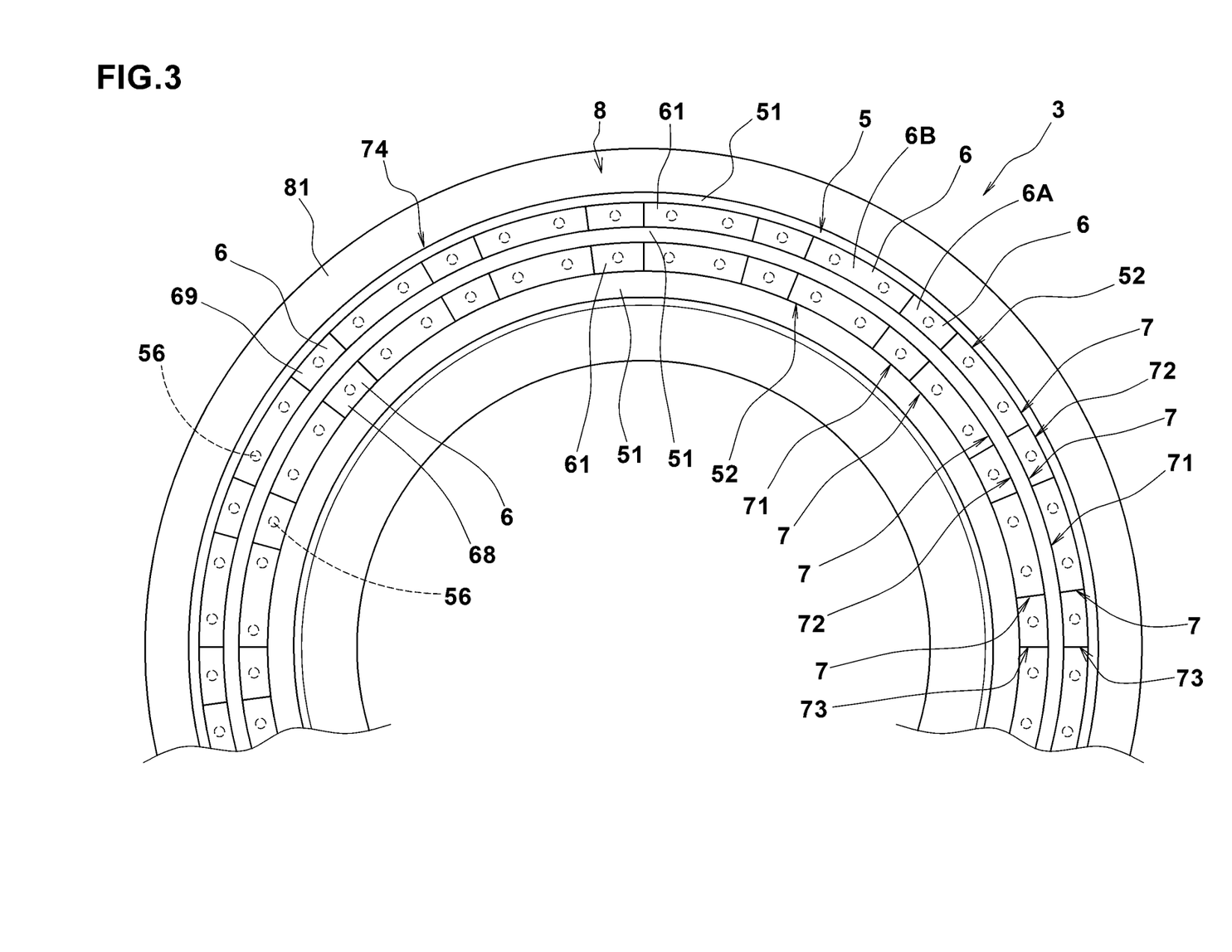
FIG. 3 is a schematic partial view of the sidewall ring shown in FIG. 1 viewed from the inside in a tire axial direction, showing the axially inner surface of the sidewall ring.

FIGS. 2 and 3 show a part of the sidewall ring 3.

Each of the sidewall rings 3 comprises a main body 5 extending continuous in the circumferential direction, and a plurality of mold pieces 6 mounted on the main body 5.

The main body 5 is provided with first molding surfaces 51 for molding a part of the axially outer surface of the sidewall portion of the tire.

Each of the mold pieces 6 is provided with a second molding surface 61 for molding a part of the axially outer surface of the sidewall portion.

The first molding surfaces 51 and the second molding surfaces 61 constitute the molding surface of the main body 5 for molding the axially outer surface of the sidewall portion.

The first molding surfaces 51 and the second molding surfaces 61 may be provided with embossed or debossed patterns, characters and the like corresponding to the design of the sidewall portion.

The main body 5 is provided with the above-mentioned first molding surfaces 51, at least one in this embodiment two circumferentially extending grooves 52 extending continuously in the circumferential direction, and exhaust flow paths 53 extending from each circumferentially extending groove 52 to the outer side of the main body 5.

Each circumferentially extending groove 52 is recessed from the first molding surfaces 51, and thereby the first molding surfaces 51 are separated in the radial direction. Each circumferentially extending groove 52 forms an annular space into which the mold pieces 6 are mounted.

The exhaust flow paths 53 are formed so as to extend from the circumferentially extending grooves 52 to the axially outer surface of the main body 5. In this embodiment, the exhaust flow paths 53 extend from the bottom surfaces 52a of the circumferentially extending grooves 52 to the outside of the tire vulcanizing mold 1 so that the internal space of each circumferentially extending groove 52 communicates with the outside of the tire vulcanizing mold 1. The exhaust flow paths 53 allow the air in the circumferentially extending groove 52 to be exhausted to the outside of the tire vulcanizing mold 1. With respect to each circumferentially extending groove 52, the exhaust flow paths 53 are provided at intervals in the circumferential direction. As a result, the air in the circumferentially extending groove 52 can be discharged quickly and evenly in the circumferential direction.

The mold pieces 6 mounted in the circumferentially extending groove 52 are adjacent to each other in the circumferential direction. Between the mold pieces 6 and/or between the mold pieces 6 and the main body 5, micro-gaps 7 are formed. As a result, air existing between the sidewall ring 3 and the raw tire put in the mold 1 during vulcanization molding, can be exhausted, through the micro-gaps 7 and the exhaust flow paths 53, toward the outside of the main body 5 and the outside of the tire vulcanizing mold 1.

Therefore, the air can be discharged without the need for vent holes opening in the first molding surface 51. Thus, it is possible to eliminate the occurrence of spews from the sidewall portions of the tire T.

Since the mold pieces 6 mounted in the circumferentially extending groove 52 are adjacent to each other in the circumferential direction, the circumferentially extending groove 52 is not interrupted in the circumferential direction. This simplifies the shape of the main body 5 and facilitates cost reduction of the tire vulcanizing mold 1.

Further, it becomes possible to easily improve the durability of the main body 5.

It is preferable that the circumferentially extending groove 52 is continuous in the circumferential direction, namely extends along the entire circumference as in this embodiment. Thereby, the shape of the main body 5 is remarkably simplified, and the processing becomes even easier.

As shown in FIG. 3, the mold pieces 6 in this embodiment include mold pieces 6A having a small circumferential length and mold pieces 6B having a large circumferential length.

The mold pieces 6A and the mold pieces 6B are alternately arranged in the circumferential direction.

Figure 4:
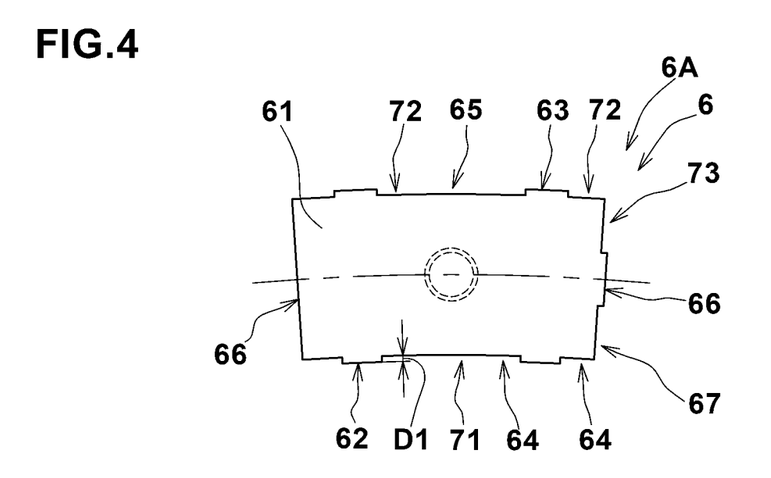
FIG. 4 is a plan view of a small mold piece, showing the axially inner surface thereof.
Figure 5:
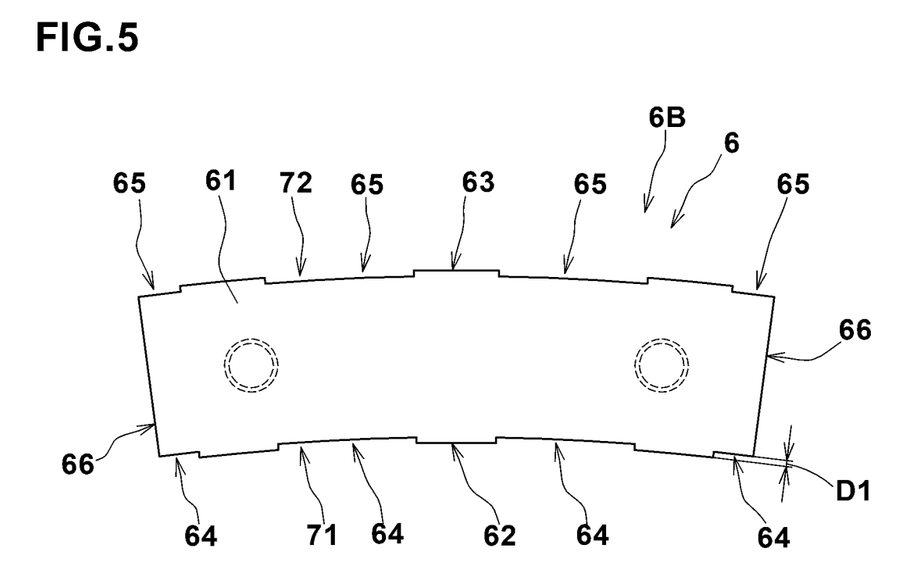
FIG. 5 is a plan view of a longer mold piece, showing the axially inner surface thereof.
Figure 6:
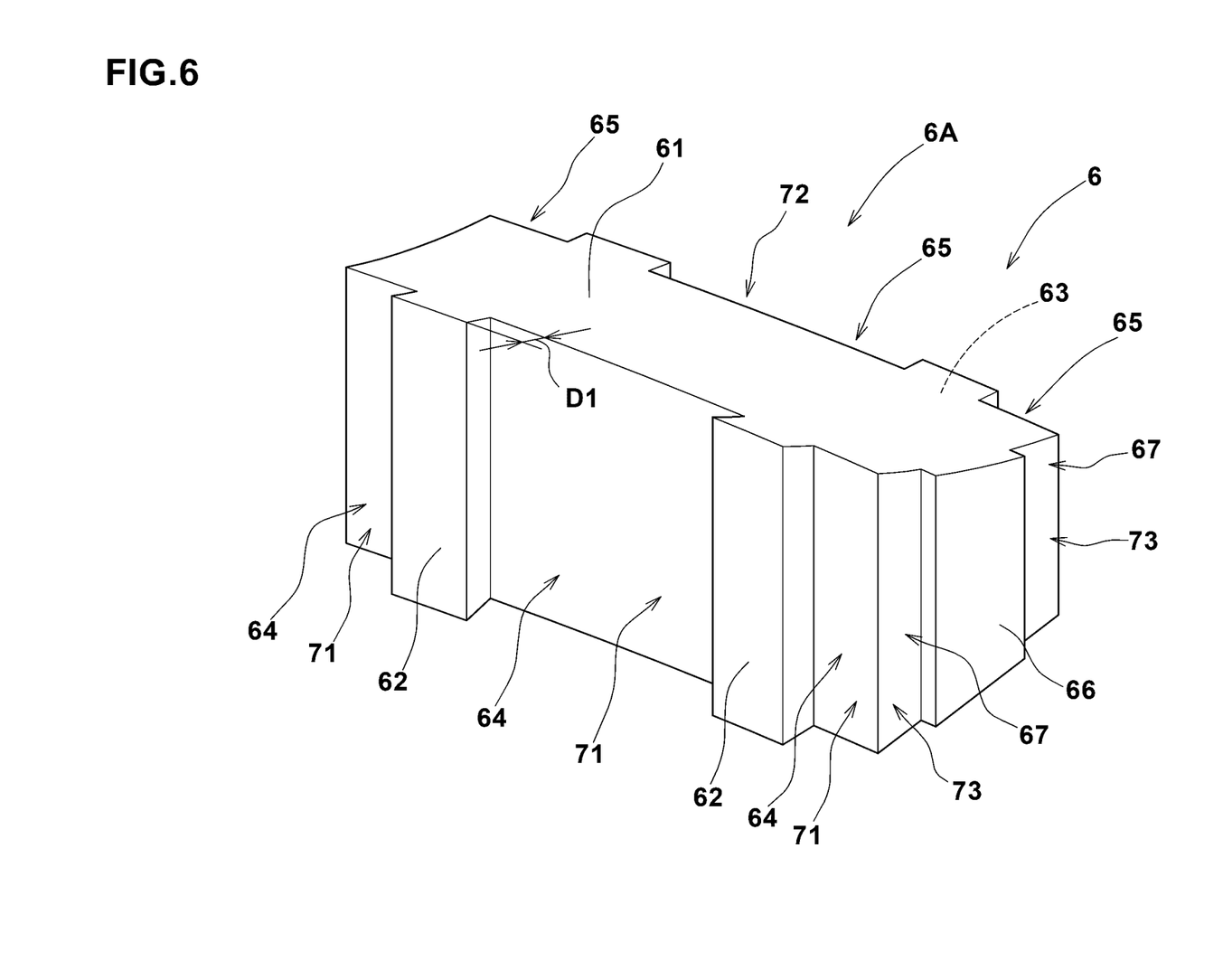
FIG. 6 is a perspective view of the mold piece shown in FIG. 4.

FIGS. 4 and 5 are plan views of the mold piece 6A and mold piece 6B. FIG. 6 is a perspective view of the mold piece 6A.

The mold pieces 6 (6A, 6B) each have an outer peripheral surface and an inner peripheral surface in the radial direction of the sidewall ring 3.

The micro-gaps 7 include first micro-gaps 71 formed between the main body 5 and first peripheral surfaces 62 of the mold pieces 6 (6A, 6B).

In this example, the first peripheral surfaces 62 are the radially inner peripheral surfaces of the mold pieces 6 (6A, 6B). Thus, the first micro-gaps 71 each extend in the circumferential direction of the sidewall ring 3.

Incidentally, the first peripheral surfaces 62 may be the radially outer peripheral surfaces.

As shown in FIGS. 4 and 6, the first peripheral surface 62 of each mold piece 6A is provided with a first shallow groove 64.

In the mold piece 6A, the first shallow groove 64 extends between the second molding surface 61 and the bottom surface 52a of the circumferentially extending groove 52 (see FIG. 2) to form the first micro-gaps 71.

Of the first peripheral surface 62, regions where the first shallow groove 64 is not formed, protrude radially inwardly and can contact with a side wall (radially inner sidewall in this example) of the circumferentially extending groove 52 of the main body 5. As a result, the mold pieces 6A are accurately positioned with respect to the main body 5.

The depth D1 of the first shallow groove 64 is preferably in a range from 0.06% to 0.3% of the maximum depth of the circumferentially extending groove 52.

By setting the depth D1 to be at least 0.06% of the maximum depth, air can easily pass through the first micro-gaps 71. By setting the depth D1 to be at most 0.3% of the maximum depth, the raw rubber constituting the sidewall portion can not flow into the first micro-gaps 71, therefore, the appearance of the vulcanized tire may be improved.

From the above viewpoint, the desirable depth D1 of the first shallow groove 64 is from 0.01 mm to 0.05 mm.

As shown in FIG. 5, the first peripheral surface 62 of each mold piece 6B is provided with two first shallow grooves 64.

In the mold piece 6B, the first shallow grooves 64 each extend between the second molding surface 61 and the bottom surface 52a of the circumferentially extending groove 52 (see FIG. 2) to form the first micro-gaps 71.

Of the first peripheral surface 62, regions where the first shallow grooves 64 are not formed, protrude radially outwardly and can contact with a side wall (radially inner sidewall in this example) of the circumferentially extending groove 52 of the main body 5. As a result, the mold pieces 6B are accurately positioned with respect to the main body 5.

The depth D1 of the first shallow groove 64 of the mold piece 6B is the same as the depth D1 of the first shallow groove 64 of the mold piece 6A.

Each of the mold pieces 6 has a second peripheral surface 63 on the opposite side of the first peripheral surface 62, that is, the radially outer peripheral surface in this example.

The micro-gaps 7 include second micro-gaps 72 formed between the main body 5 and the second peripheral surfaces 63.

Thus, the second micro-gaps 72 each extend in the circumferential direction of the sidewall ring 3.

In this embodiment, as shown in FIGS. 4, 5 and 6, the second peripheral surfaces 63 of the mold pieces 6A and 6B are provided with second shallow grooves 65.

The second shallow grooves 65 each extend between the second molding surface 61 and the bottom surface 52a of the circumferentially extending groove 52 to form the second micro-gaps 72.

Of the second peripheral surface 63, regions where the second shallow groove 65 is not formed, protrude radially outwardly and can contact with a side wall (radially outer side wall) of the circumferentially extending groove 52 of the main body 5.

As a result, the mold pieces 6A and 6B are accurately positioned with respect to the main body 5.

In the mold pieces 6A and 6B, the depth of the second shallow groove 65 is the same as that of the first shallow groove 64.

Each of the mold pieces 6 has end surfaces 66 in the circumferential direction of the sidewall ring 3.

The micro-gaps 7 include third micro-gaps 73 formed between the circumferential end surfaces 66 of the mold pieces 6 adjacent in the circumferential direction of the sidewall ring 3. Thus, the third micro-gaps 73 extend in the radial direction of the sidewall ring 3.

In this embodiment, the circumferential end surfaces 66 of the mold pieces 6A are provided with third shallow grooves 67. But, the third shallow grooves 67 may be provided in the opposing circumferential end surfaces 66 of the mold pieces 6B instead. The third shallow groove 67 extends between the second molding surface 61 and the bottom surface 52a of the circumferentially extending groove 52 to form the third micro-gap 73.

Of the circumferential end surface 66 with the third shallow groove 67, a region where the third shallow groove 67 is not formed, protrudes in the circumferential direction of the sidewall ring 3 and can contact with the opposing circumferential end surface 66 of the adjacent mold piece 6B. Thereby, each mold piece 6A, 6B is positioned accurately.

Preferably, the third micro-gaps 73 are in communication with the first micro-gaps 71. Thus, the third micro-gaps 73 and the first micro-gaps 71 act synergistically to promote air discharge. For the same reason, it is preferable that the third micro-gaps 73 are in communication with the second micro-gaps 72.

In this embodiment, as shown in FIG. 2, the circumferentially extending groove 52 includes a radially inner circumferentially extending groove 54 and a radially outer circumferentially extending groove 55.

In this embodiment, the first molding surfaces 51 are a first molding surface between the radially inner circumferentially extending groove 54 and the radially outer circumferentially extending groove 55,
a first molding surface radially inside the radially inner circumferentially extending groove 54 and
a first molding surface radially outside the radially outer circumferentially extending groove 55.

As shown in FIGS. 2 and 3, radially inner mold pieces 68 are mounted in the radially inner circumferentially extending groove 54, and radially outer mold pieces 69 are mounted in the radially outer circumferentially extending groove 55.
Thus, the mold pieces 6 in this embodiment are the radially inner mold pieces 68 and the radially outer mold pieces 69. Further, the radially inner mold pieces 68 include the above-mentioned mold pieces 6A and 6B, and the radially outer mold pieces 69 include the above-mentioned mold pieces 6A and 6B. With such configuration, the first micro-gaps 71, the second micro-gaps 72, and the third micro-gaps 73 are uniformly arranged, and air can be more easily discharged.

The mold pieces 6 are each detachably fixed to the main body 5, for example, by the use of fasteners. As the fastener, for example, a bolt 56 penetrating the main body 5 from the axially outer side thereof and engaging with a threaded hole of the mold piece 6, may be used. Thereby, the mold pieces 6 can be easily changed according to designs of the sidewall portion.

Further, a spacer may be inserted between each mold piece 6 and the bottom surface 52a of the circumferentially extending groove 52 in order to form a micro-gap therebetween.

In this embodiment, the main body 5 further comprises an annular mold piece 8 which extends annularly and continuously in the circumferential direction in the form of a ring. The annular mold piece 8 is mounted on the main body 5 on the radially outside of the radially outer mold pieces 69 in this example.
In order to mount the annular mold piece 8, the main body 5 is provided with a circumferentially extending groove 57 or recess into which the annular mold piece 8 is mounted. Incidentally, it is also possible that the main body 5 comprises an annular mold piece 8 mounted on the radially inside of the radially inner mold piece 68, instead of, or in combination with the above-mentioned radially outer annular mold piece 8.

The annular mold piece 8 is provided with a molding surface 81 for molding a part of the axially outer surface of the sidewall portion of the tire T.
Between the main body 5 and the adjacent peripheral surface of the annular mold piece 8, micro-gaps 74 are also formed. In this example, the adjacent peripheral surface is a radially inner peripheral surface, and provided with shallow grooves (not shown) same as those of the mold pieces 6A and 6B to form the micro-gaps 74 certainty and accurately.

While detailed description has been made of a preferable embodiment of the present invention, the present invention can be embodied in various forms without being limited to the illustrated embodiment.

DESCRIPTION OF THE REFERENCE SIGNS 1 tire vulcanizing mold
3 sidewall ring
5 main body
6 mold piece
7 micro-gap
51 first molding surface
52 circumferentially extending groove
52a bottom surface
53 exhaust flow path
54 radially inner circumferentially extending groove
55 radially outer circumferentially extending groove
56 bolt
61 second molding surface
62 first peripheral surface
63 second peripheral surface
64 first shallow groove
65 second shallow groove
66 circumferential end surface
67 third shallow groove
68 radially inner mold piece
69 radially outer mold piece
71 first micro-gap
72 second micro-gap
73 third micro-gap

The invention claimed is:

1. A tire vulcanizing mold comprising:
a sidewall ring for molding a sidewall portion of a tire, the sidewall ring comprising
a main body extending continuously in the circumferential direction thereof, and
a plurality of mold pieces mounted on the main body,
the main body is provided with
a first molding surface for molding a part of the outer surface of the sidewall portion,
a circumferentially extending groove recessed from the first molding surface and extending in the circumferential direction, and
exhaust flow paths extending from the circumferentially extending groove to an outside of the main body,
each of the mold pieces has a second molding surface for molding a part of the outer surface of the sidewall portion,
the mold pieces are mounted in the circumferentially extending groove so as to be adjacently to each other in the circumferential direction, and
micro-gaps for discharging gas existing in the tire vulcanizing mold are formed between the mold pieces, and/or between the main body and the mold pieces so as to communicate with the exhaust flow paths.

2. The tire vulcanizing mold according to claim 1, wherein
the micro-gaps include a first micro-gap formed between the main body and a first peripheral surface of each mold piece which surface is on the radially inside or radially outside of the above-said each mold piece.

3. The tire vulcanizing mold according to claim 2, wherein
said first peripheral surface is provided with a first shallow groove for forming the first micro-gap to extend between the second molding surface and a bottom surface of the circumferentially extending groove.

4. The tire vulcanizing mold according to claim 3, wherein
the depth of the first shallow groove is 0.06% to 0.3% of the depth of the circumferentially extending groove.

5. The tire vulcanizing mold according to claim 4, wherein
the depth of the first shallow groove is in a range from 0.01 to 0.05 mm.

6. The tire vulcanizing mold according to claim 2, wherein
the micro-gaps include a second micro-gap formed between the main body and a second peripheral surface of said each mold piece which surface is on the opposite side of said first peripheral surface.

7. The tire vulcanizing mold according to claim 3, wherein
the micro-gaps include a second micro-gap formed between the main body and a second peripheral surface of said each mold piece which surface is on the opposite side of said first peripheral surface.

8. The tire vulcanizing mold according to claim 4, wherein
the micro-gaps include a second micro-gap formed between the main body and a second peripheral surface of said each mold piece which surface is on the opposite side of said first peripheral surface.

9. The tire vulcanizing mold according to claim 5, wherein
the micro-gaps include a second micro-gap formed between the main body and a second peripheral surface of said each mold piece which surface is on the opposite side of said first peripheral surface.

10. The tire vulcanizing mold according to claim 6, wherein
said second peripheral surface is provided with a second shallow groove forming the second micro-gap and extending between the second molding surface and the bottom surface of the circumferentially extending groove.

11. The tire vulcanizing mold according to claim 2, wherein
the micro-gaps include third micro-gaps formed between circumferential end surfaces of the mold pieces which end surfaces are adjacent to each other in the circumferential direction.

12. The tire vulcanizing mold according to claim 6, wherein
the micro-gaps include third micro-gaps formed between circumferential end surfaces of the mold pieces which end surfaces are adjacent to each other in the circumferential direction.

13. The tire vulcanizing mold according to claim 10, wherein
the micro-gaps include third micro-gaps formed between circumferential end surfaces of the mold pieces which end surfaces are adjacent to each other in the circumferential direction.

14. The tire vulcanizing mold according to claim 11, wherein
the circumferential end surfaces are provided with third shallow grooves forming the third micro-gaps and extending between the second molding surface and the bottom surface of the circumferentially extending groove.

15. The tire vulcanizing mold according to claim 12, wherein
the circumferential end surfaces are provided with third shallow grooves forming the third micro-gaps and extending between the second molding surface and the bottom surface of the circumferentially extending groove.

16. The tire vulcanizing mold according to claim 13, wherein
the circumferential end surfaces are provided with third shallow grooves forming the third micro-gaps and extending between the second molding surface and the bottom surface of the circumferentially extending groove.

17. The tire vulcanizing mold according to claim 11, wherein
the third micro-gaps communicate with the first micro-gaps.

18. The tire vulcanizing mold according to claim 1, wherein
the circumferentially extending groove extends annularly and continuously in the circumferential direction of the sidewall ring.

19. The tire vulcanizing mold according to claim 1, wherein
the circumferentially extending groove includes a radially inner circumferentially extending groove and a radially outer circumferentially extending groove, and
the mold pieces include radially inner mold pieces mounted in the radially inner circumferentially extending groove, and radially outer mold pieces mounted in the radially outer circumferentially extending groove.

20. The tire vulcanizing mold according to claim 1, wherein
each of the mold pieces is detachably attached to the main body.

* * * * *